(12) United States Patent
Rousseau et al.

(10) Patent No.: US 8,226,402 B2
(45) Date of Patent: Jul. 24, 2012

(54) MOLD FOR FABRICATING THERMOPLASTIC CONTAINERS, AND A BLOW-MOLDING OR STRETCH-BLOW MOLDING INSTALLATION EQUIPPED WITH SUCH A MOLD

(75) Inventors: Nicolas Rousseau, Octeville-sur-Mer (FR); Michel Norture, Octeville-sur-Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 216 days.

(21) Appl. No.: 12/808,951

(22) PCT Filed: Dec. 16, 2008

(86) PCT No.: PCT/FR2008/052322
§ 371 (c)(1), (2), (4) Date: Jun. 17, 2010

(87) PCT Pub. No.: WO2009/081027
PCT Pub. Date: Jul. 2, 2009

(65) Prior Publication Data
US 2010/0310704 A1 Dec. 9, 2010

(30) Foreign Application Priority Data
Dec. 17, 2007 (FR) ..................... 07 59903

(51) Int. Cl.
*B29C 49/64* (2006.01)

(52) U.S. Cl. ............ 425/526; 249/79; 249/111
(58) Field of Classification Search ........... 425/526; 249/79, 111
See application file for complete search history.

(56) References Cited

U.S. PATENT DOCUMENTS

| 4,871,507 | A | * | 10/1989 | Ajmera ............ 264/521 |
| 6,113,377 | A | * | 9/2000 | Clark ............... 425/195 |
| 6,447,281 | B1 | | 9/2002 | Petre |
| 6,464,486 | B1 | | 10/2002 | Barray et al. |
| 2004/0202746 | A1 | | 10/2004 | Tsau et al. |

FOREIGN PATENT DOCUMENTS

| FR | 2 764 544 A1 | 12/1998 |
| GB | 2 050 919 A | 1/1981 |
| JP | 57-12618 A | 1/1982 |
| JP | 57-84825 A | 5/1982 |

* cited by examiner

Primary Examiner — Robert B Davis
(74) Attorney, Agent, or Firm — Sughrue Mion, PLLC

(57) ABSTRACT

A mold for fabricating containers made of thermoplastic material by blow-molding or stretch-blow molding a blank, which mold has a seat situated at the opening in the molding cavity for the purpose of receiving the rim of said blank, and cooling means for cooling said rim and, between said cooling means and the impression of the shoulder of the cavity of the mold, said mold has thermal insulation means for breaking a thermal bridge. The cooling circuit for cooling the rim is etched in a lid that is mounted around the opening of the cavity of the mold, and this etched portion rests in leaktight manner on a piece that acts as a thermal insulator.

11 Claims, 4 Drawing Sheets

MOLD FOR FABRICATING THERMOPLASTIC CONTAINERS, AND A BLOW-MOLDING OR STRETCH-BLOW MOLDING INSTALLATION EQUIPPED WITH SUCH A MOLD

CROSS REFERENCE TO RELATED APPLICATIONS

This application is a National Stage of International Application No. PCT/FR2008/052322 filed Dec. 16, 2008 claiming priority based on French Patent Application No. 07 59903 filed Dec. 17, 2007, the contents of all of which are incorporated herein by reference in their entirety.

FIELD OF THE INVENTION

The present invention relates to a mold for fabricating containers made of a thermoplastic material, in particular bottles made of a thermoplastic material, such as polyethylene terephtalate (PET), by blow molding or stretch-blow molding a blank (e.g. a preform), said mold having a face that is provided with an opening communicating with a molding cavity.

DESCRIPTION OF THE PRIOR ART

Molds making it possible to obtain containers from blanks are well-known nowadays. It is thus known that a blank made of a thermoplastic material and whose body is heated to a temperature of no less than the softening temperature of the material can be used to blow-mold or to stretch-blow mold either a container having its final shape, or else an intermediate container that is subsequently blow-molded or stretch-blow molded again. In the description below, the term "blank" is used to mean either a preform, or such an intermediate container, the blank in all of the examples having a neck portion provided with a rim that extends substantially in a plane that is transverse to the longitudinal axis of the blank.

Commonly, the preform made of a thermoplastic material is fabricated by injection molding with its neck provided with its rim that is in its final shape, i.e. in the shape and to the exact dimensions that it is to have once the final container is obtained. That is why it is particularly important to avoid heating that portion of the preform or of the intermediate container so as to avoid it deforming, which would result in the blow-molded container being rejected, and thus in financial loss.

Unfortunately, certain fabrication processes, such as those described in Documents GB 2 050 919, JP 57 012618, and US 2004/0202746, require the mold to be hot (and thus either heated, or at least, maintained at a regulated temperature) so as to obtain containers having particular characteristics enabling them subsequently to withstand determined thermal effects, for example, without deforming significantly. This applies in particular to containers designed to be hot-filled (e.g. with liquids such as tea, pasteurized fruit juice, etc.) or indeed to containers that are to be subjected to a process for pasteurizing their contents.

When the mold is heated, there is a possibility that the neck portion of the blank might be heated, at the time of the blow-molding or stretch-blow molding operation, when the body of the blank is placed in the molding cavity with its rim resting on the mold.

In order to prevent the neck portion and the rim of the blank from being heated, it is known for the mold to be provided with cooling means, as described in Document JP 57 084825, for example. Said means are constituted by half-rings that surround the neck of the container, and each half-ring is arranged so that its temperature is regulated by suitable cooling means so that the entire zone of the neck, and not only the rim, is maintained at a temperature that is low enough to avoid any risk of deformation.

More precisely, FIGS. 1 and 2 are fragmentary views in section and in perspective showing a prior art molding device, the prior art device in FIG. 2 being described in the document now published under number WO2008/009808.

The molding device shown in FIG. 1 comprises a mold 1 that is made up of two half-molds 2 mounted to move relative to each other.

The cavity 3 formed by the two half-molds 2 presents the impression of the final container (not shown in the figures). This axial cavity 3 is made up of the impression 4 that corresponds to the body of the container, of the impression 5 that corresponds to the shoulder of said container, and of the impression that corresponds to the portion under the rim and that forms an orifice 6 putting said cavity 3 into communication with the outside of the mold 1. In the various figures, the bottom of the mold 1 is not shown.

On its top face, each half-mold 2 has a half-ring 7. When the two half-molds 2 are in the closed position, the half-rings 7 co-operate to form an annular ring that serves, in particular, as a surface for receiving and bearing against the rim of the blank (not shown). That receiving and bearing surface acts as a seat 8 for the rim of the receptacle. Each bearing half-ring 7 is fastened on its half-mold 2 by screws, for example.

The half-rings 7 also form a surface for receiving the blow nozzle, and in particular for receiving a nozzle as described in the document published under No. FR 2 764 544.

Commonly, and as appears more clearly in FIG. 2, a plurality of channels 9 are provided directly inside each half-mold 2, through which channels a cooling fluid (in general, refrigerated water) can circulate in such a manner as to maintain each bearing half-ring 7 (not shown in FIG. 2) at a temperature that is not conducive to giving rise to deformation of the rim and of the neck of the blank. Those cooling channels 9 form a circuit that is W-shaped in appearance.

Thus, it can be observed that, due to this W-shaped arrangement of the cooling channels 9, the semi-circular periphery of the orifice 6 of the half-mold 2, against which the portion immediately below the rim of the blank comes to bear, is not cooled uniformly by said cooling channels 9; said cooling channels lie at various distances from said orifice 6.

In addition, in the prior art, the cooling channels 9 are formed directly in the half-molds 2. They must therefore by formed by boring, which makes them difficult to form and limits how they can be arranged, because it is then possible only to form cooling channels that are rectilinear, hence the need to implement a W-shape for the cooling circuit. They are also difficult to access during cleaning operations. It would therefore be advantageous to provide cooling means about the axis xx of the mold 1 that are easy to maintain and to clean, and that also enable the portion of the mold that is designed to be in contact with the rim of the blank to be cooled more uniformly.

SUMMARY OF THE INVENTION

An object of the present invention is to solve those various problems.

Thus, in a first one of its aspects, the present invention provides a mold for fabricating containers made of thermoplastic material by blow-molding or stretch-blow molding a blank having a neck provided with a rim, which mold has at least one axial molding cavity with an orifice open towards the outside and has both a plurality of circuits for channeling heating and cooling fluids and also thermal insulation means for thermally insulating the zone of the rim at said orifice from the zone that corresponds to the impression of the shoulder of said container, said cooling circuit for cooling said zone of the said collar being etched in the thickness of a lid that covers said thermal insulation means, said circuit being etched in the face of said lid that faces towards said insulation means, which insulation means act as a closure and sealing wall for said cooling circuit.

According to a preferred provision of the invention, the mold has a lid that forms the inlet of the orifice of the molding cavity, which inlet is arranged in the form of a seat for receiving the rim of the blank.

Also according to the invention, the sealing means interposed between the lid and the zone of the impression corresponding to the shoulder are in the form of a thermally insulating piece that is positioned in a radial housing arranged between the seat for the rim and the zone corresponding to the impression of the shoulder of the container.

According to another provision of the invention, on the same side as the lid, the insulation piece is provided with a groove formed around its periphery for the purpose of receiving a sealing gasket that surrounds the cooling circuit.

Also according to the invention, the cooling circuit has a portion that is of shape matching the shape of the opening of the orifice of the molding cavity.

According to another provision of the invention, the insulation piece has a plane first surface on the same side as the lid, and a second surface on the same side as the impression of the shoulder of the mold, said second surface being provided with recesses suitable for receiving linings of thermally insulating material.

Also according to the invention, the insulation piece forms at least a portion of a ring with a central hole of size substantially complementary to the orifice.

According to another provision of the invention, the lid is provided with a recess for receiving all or some part of the insulation piece.

Also according to the invention, the mold may itself also be provided with a recess for receiving all or some part of the insulation piece.

According to another provision of the invention, the mold is made up of at least two half-molds that can be moved apart, and each half-mold is equipped with a respective lid portion, so that each half-mold has at least one cooling circuit for cooling the rim.

The invention further provides a blow-molding or stretch-blow molding installation for fabricating containers from blanks of thermoplastic material that are disposed in a molding cavity of a mold provided with an orifice communicating with said cavity, which orifice is edged with a seat for receiving the rim of each of said blanks, each blank being provided with a neck that, in the blowing position, emerges from said orifice while its body is engaged in said molding cavity, said mold being arranged according to the above-defined provisions.

BRIEF DESCRIPTION OF THE DRAWINGS

The present invention is described below through an example that is given merely by way of illustration and that in no way limits the scope of the present invention and with reference to the accompanying figures, in which.

DETAILED DESCRIPTION OF THE INVENTION

Figure 3:
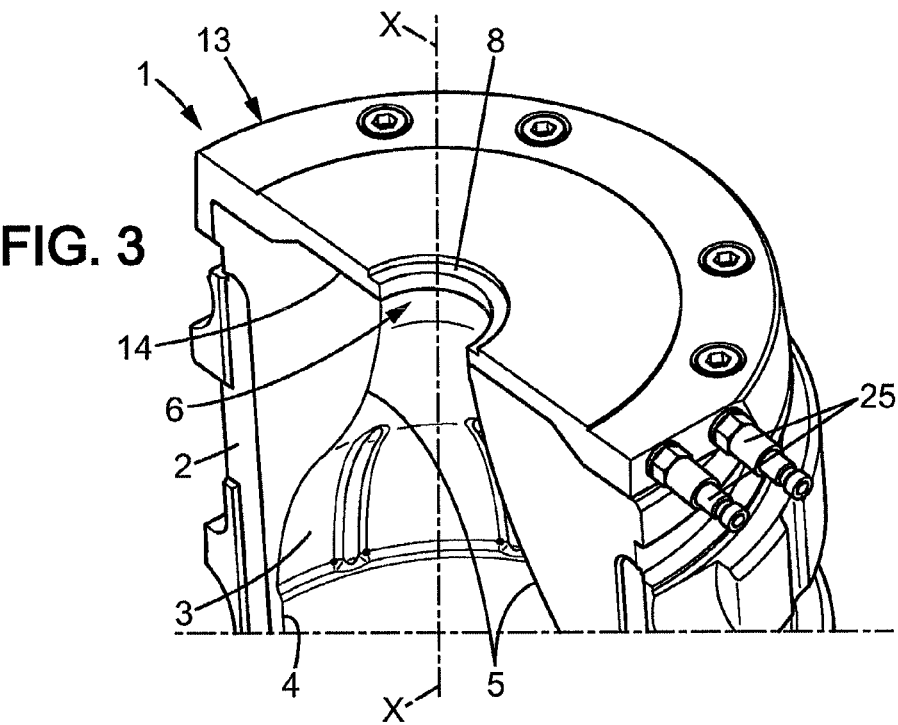
FIG. 3 is a fragmentary perspective view of a mold of the invention equipped with cooling means for cooling the neck of a blank.

As shown more precisely in FIG. 3, the present invention relates to a mold 1 for fabricating containers made of thermoplastic material by blow-molding or stretch-blow molding a blank (in general a preform or a pre-blown preform), said mold 1 having a face that is provided with the orifice 6 communicating with the molding cavity 3.

Elements that are identical to elements of the prior art mold 1 are referenced by the same numbers.

The invention is more particularly, but not exclusively, applicable to molds that make it possible to blow-mold or to stretch-blow mold blanks while hot, i.e. molds in which a heating circuit is provided inside the mold so as to heat the inside periphery of the molding cavity 3.

Usually, that face of the mold 1 that is provided with the orifice 6 is the top surface of said mold 1 (the blowing or stretching-and-blowing operation then taking place from the top of the mold). However, the general principle of the invention also applies for any face of the mold that has an opening communicating with a molding cavity.

Figure 4:
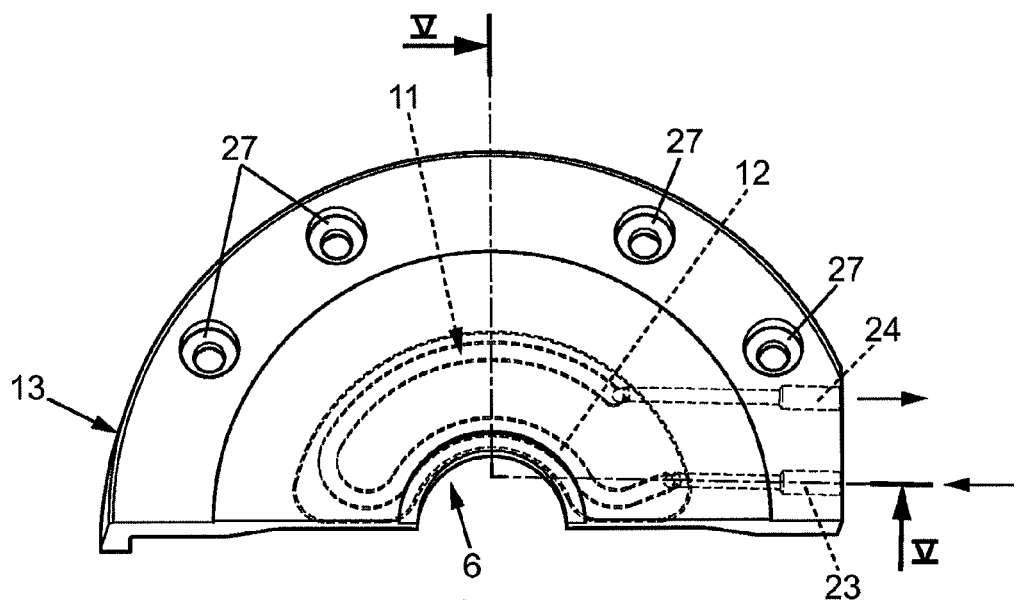
FIG. 4 is a top view of the cooling lid with the cooling fluid circulation path inside said lid being shown in dashed lines.
Figure 5:
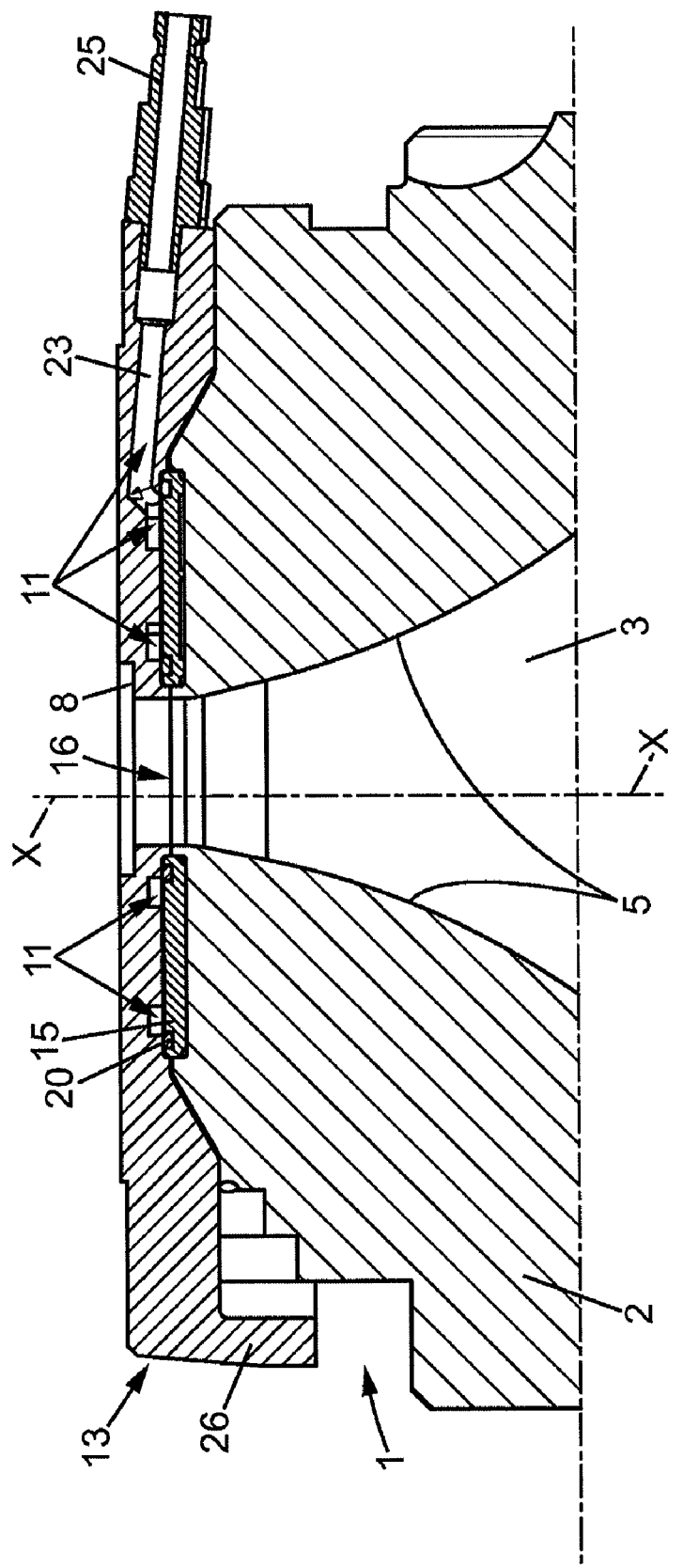
FIG. 5 is a view in section on 5-5 of FIG. 4 showing the means for cooling the neck of a blank of the invention.

As shown in FIG. 4, the mold 1 is provided with a cooling fluid circulation circuit 11 (the cooling fluid preferably being refrigerated water).

Figure 1:
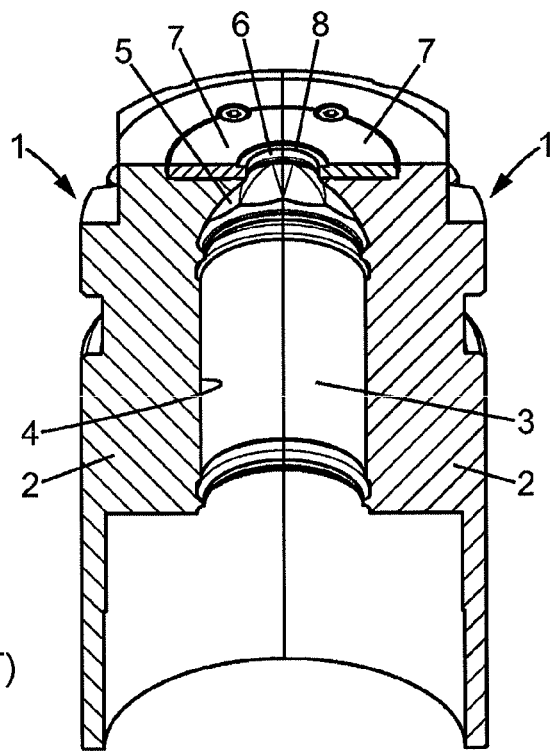
FIG. 1 is a fragmentary perspective view in section of a prior art molding device.
Figure 2:
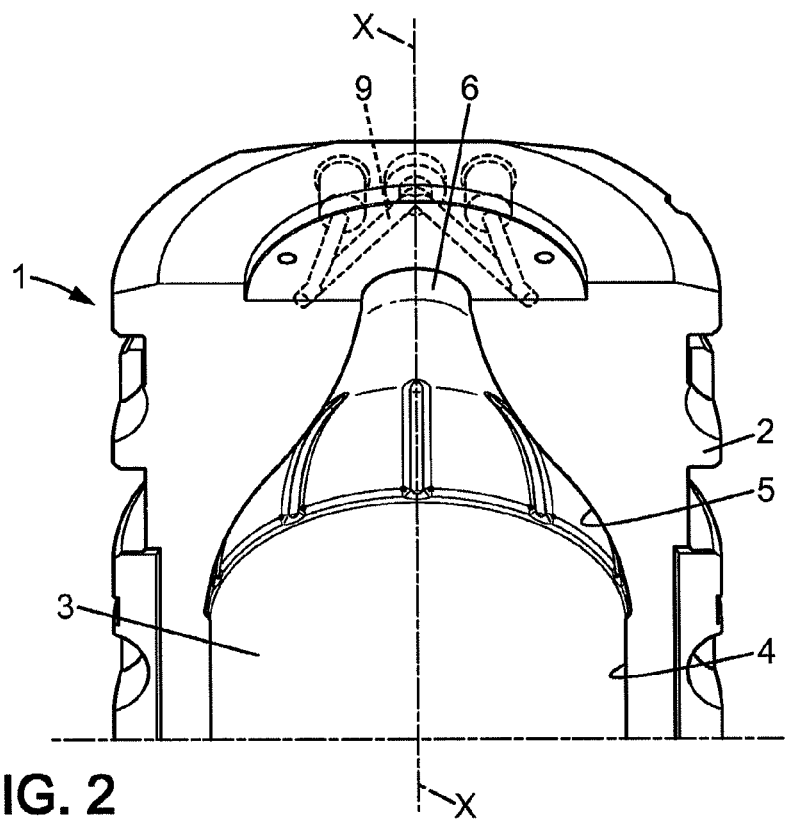
FIG. 2 is a fragmentary perspective view of a prior art mold, showing the cooling means for cooling the neck portion of the blank, as described in Document WO2008/009808.

Advantageously, the cooling circuit 11 is not bored inside the mold 1 as it is in the prior art with cooling channels 9 as shown in FIG. 2.

The invention offers the advantage of enabling a cooling circuit 11 to be formed by machining other than by drilling.

The circuit 11 has a portion 12 that is of shape substantially matching the shape of the orifice 6 of the mold 1 that communicates with the molding cavity 3, and by means of this portion of the circuit 11, the periphery of said orifice 6, and therefore the rim of the blank, can be cooled substantially uniformly. The circuit 11 thus has a general shape that is similar to the shape of a kidney bean, with at least one portion situated at a constant distance relative to the orifice 6.

In a preferred embodiment of the invention, the cooling circuit 3 is formed at least in part in at least a portion of a lid 13 or cap that is secured to the surface 14 of the mold 1.

This lid 13 is provided with the seat 8 on which the rim of the blank comes to bear. The rim is thus cooled by the cooling fluid circulating inside the lid 13.

The invention applies more particularly to a mold 1 made up of at least two half-molds 2 that can be moved apart, each half-mold 2 is then equipped with a portion of the cooling lid 13 (in general, this portion is constituted by a cooling half-lid 13), so that each half-lid 2 is provided with at least one cooling circuit 11 that, in part, faces the surface 14 of the half-mold 2. This circuit 11 is etched in the shape of a kidney bean in the thickness of the lid 13, over the inside surface thereof that is placed on the mold 1.

The lid 13 makes it possible to cool the rim and that portion of the neck of the blank that must not be deformed during the blowing or stretch-blowing operation, while that portion of the blank that is situated in the molding cavity 3 can be blown, or stretch-blown while hot.

In order to improve the cooling of the rim of the blank and in order to provide thermal separation between firstly the heating of the mold 1, namely of the inside periphery of the cavity 3, and secondly the cooling of the rim of the blank, the lid 13 may co-operate with the surface 14 of the mold 1 to define a radial recess that makes it possible to position a piece 15, preferably of the insulating type (i.e. made of thermally insulating material of a type that is known per se), which piece 15 is interposed and acts as an interface between said surface 14 of the mold 1 and at least a portion of the cooling circuit 11.

In general, the insulation piece 15 forms at least a portion of a ring with a central orifice 16 of size substantially complementary to the orifice 6 of the mold 1. More precisely, in the embodiment shown in FIGS. 7 and 8, the insulation piece 15 is in the form of at least one half-ring of semi-circular shape and suitable for co-operating with and for securing itself to a cooling half-lid 13, which half-lid 13 is provided on each half-mold 2 of the mold 1.

The piece 15 has a first surface 17 that is substantially plane (see FIG. 7) and that faces towards the lid 13, and a second surface 18 (see FIG. 8) provided with recesses 19 defining empty volumes on the side facing towards the surface 14 of the mold 1. Each of the recesses 19 may be lined with insulating material in order to reinforce the insulating effect of the piece 15.

In addition, the first surface 17 of the piece 15 is provided with at least one groove 20 (see FIG. 7) around its periphery, in which groove a sealing gasket is positioned. Thus, a fully leaktight connection is formed between the lid 13 and said first surface 17 of the piece 15 that constitutes a wall for closing and sealing the cooling circuit 11.

The lid 13 is provided with a recess 21 of shape substantially complementary to the shape of the piece 15 (see FIG. 6), thereby making it possible at least to hold the piece 15 in position relative to the lid 13, which piece fits entirely or partially into said recess 21.

In the same way, the surface 14 of the mold 1 is provided with a recess 22 in which the insulation piece 15 is positioned, also entirely or partially.

These two recesses 21 and 22 form the radial housing for receiving said insulation piece 15 that breaks the thermal bridge between the zone of the seat 8 and the zone of the impression 5 of the shoulder.

In general, the cooling circuit 11 has a cooling fluid circulation zone in which the cooling fluid is partially in contact with the piece 15 and/or possibly with the surface 14 of the mold 1.

Figure 6:
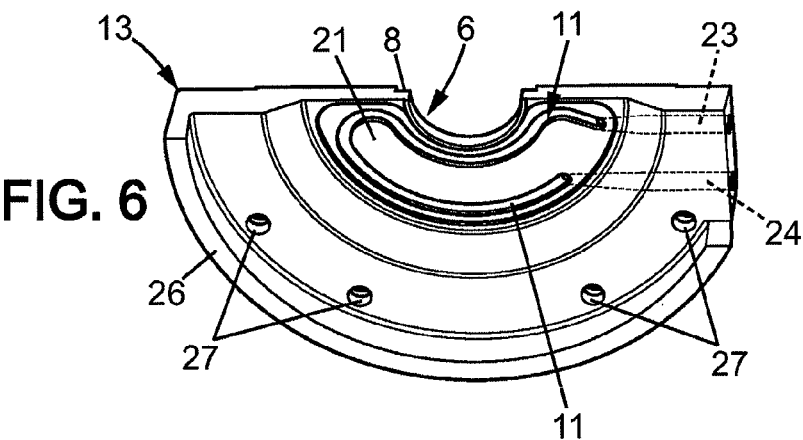
FIG. 6 is a perspective view of the bottom of the cooling lid of the invention.
Figure 7:
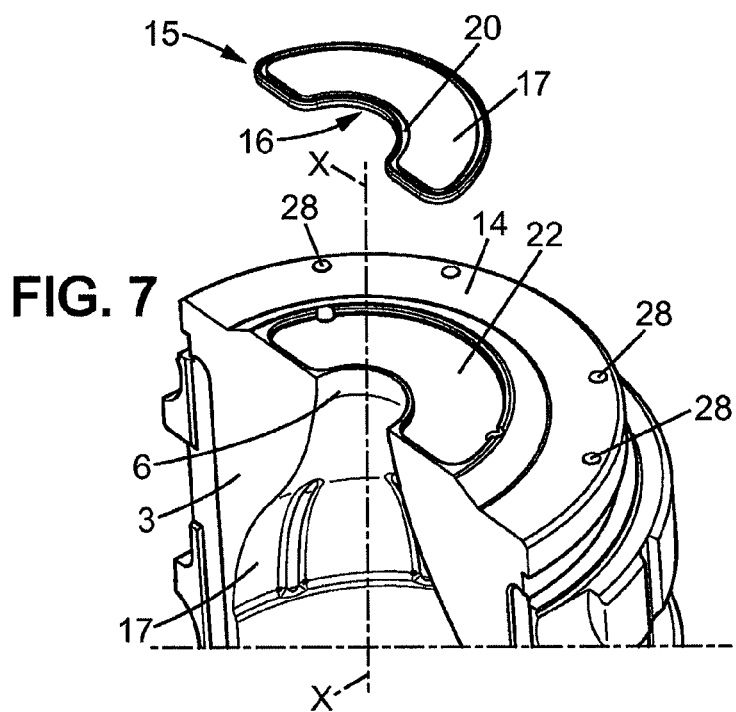
FIG. 7 is an exploded fragmentary perspective view of a mold with the insulation piece that is situated between the top surface of the mold and the lid that includes the cooling circuit.
Figure 8:
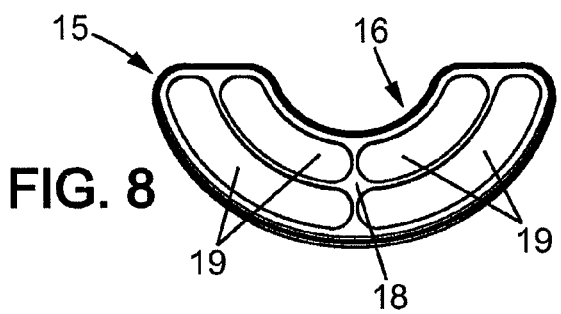
FIG. 8 is a view of the bottom of the insulation piece.

As shown more precisely in FIGS. 6 and 7, the lid 13 is provided with a cooling fluid inlet channel 23 and with a cooling fluid outlet channel 24, which channels are connected to fluid connectors 25 (see FIG. 3) of a type known per se.

The inlet channel 23 opens out into the cooling circuit 11 that is cut, in the form of a groove, in the thickness of the lid 13, which lid is also arranged to receive the insulation piece 15 so that, when said piece 15 is put in place on the lid 13, the circuit 11 is closed by the first surface 17 of said piece 15.

The lid 13 is provided with the central orifice 6 that is provided with a setback for forming the seat 8 on which the rim of the blank comes to bear.

The cooling circuit 11 in the lid 13 borders on the central orifice 6 in the lid 13 so as to cool as well as possible and in uniform manner the zone of the rim that bears against the seat 8 of said lid 13.

The circuit 11 thus has a portion extending close to the opening in the lid 13, this portion corresponding to the portion that is of shape substantially matching the shape of the orifice 6 in said lid and in said mold 1.

The go path of the cooling fluid in the circuit 11 substantially borders on the inside edge of the insulation piece 15 while the return path for the cooling fluid substantially borders on the outside edge of said piece 15.

In order to enable the lid 13 to be secured more firmly to the surface 14 of the mold 1, the lid 13 has an annular skirt 26 around its outside periphery, and a plurality of bores 27 for fastening it, e.g. by means of screws, to the surface 14 of the mold 1, which surface is also provided with tapped holes 28.

More generally, in another of its aspects, the present invention relates to a blow-molding or stretch-blow molding installation for fabricating containers from blanks made of thermoplastic polymer, each blank being disposed in the cavity 3 of the mold 1 and, as described above, the neck of said blank emerges from the surface 14 against which it bears via an annular rim while its body is engaged in said molding cavity 3 of said mold 1.

The blow-molding installation may include a blower nozzle of the bell-nozzle type for blowing a fluid under pressure into a blank disposed inside the molding cavity 3 of the mold, the nozzle having a bell-shaped end suitable, during blowing, for capping in leaktight manner the neck of the blank that emerges from the mold, and in particular in the embodiment shown in the figures, for bearing end-on in leaktight manner against the lid 13.

The invention claimed is:

1. A mold for fabricating containers made of thermoplastic material by blow-molding or stretch-blow molding a blank having a neck provided with a rim, which mold has at least one axial molding cavity with an orifice open towards the outside and has both a plurality of circuits for channeling heating and cooling fluids and also thermal insulation means for thermally insulating the zone of the rim at said orifice from the zone that corresponds to the impression of the shoulder of said container;

wherein the cooling circuit for cooling said zone of the collar is etched in the thickness of a lid that covers said thermal insulation means, said circuit being etched in the face of said lid that faces towards said insulation means, which insulation means act as a closure and sealing wall for said cooling circuit.

2. A mold according to claim 1, wherein it has a lid that forms the inlet of the orifice of the molding cavity, which inlet is arranged in the form of a seat for receiving the rim of the blank.

3. A mold according to claim 2, wherein it has sealing means that are in the form of a thermally insulating piece that is positioned in a radial housing arranged between the seat for the rim and the zone corresponding to the impression of the shoulder of the container.

4. A mold according to claim 3, wherein, on the same side as the lid, the piece is provided with a groove formed around its periphery for the purpose of receiving a sealing gasket that surrounds the cooling circuit.

5. A mold according to claim 4, wherein the cooling circuit has a portion that is of shape matching the shape of the opening of the orifice of the molding cavity.

6. A mold according to claim 4, wherein the insulation piece has a plane first surface on the same side as the lid, and a second surface on the same side as the impression of the shoulder, said second surface being provided with recesses suitable for receiving linings of thermally insulating material.

7. A mold according to claim 6, wherein the insulation piece forms at least a portion of a ring with a central hole of size substantially complementary to the orifice.

8. A mold according to claim 4, wherein the lid is provided with a recess for receiving the insulation piece.

9. A mold according to claim 4, wherein, in its surface for receiving the insulation piece, it is provided with a recess forming a portion of the housing for the insulation piece.

10. A mold according to claim 4, wherein it is made up of at least two half-molds that can be moved apart, and each half-mold is equipped with a respective lid portion, so that each half-mold has at least one cooling circuit for cooling the rim.

11. A blow-molding or stretch-blow molding installation for fabricating containers from blanks of thermoplastic material that are disposed in a molding cavity of a mold provided with an orifice communicating with said cavity, which orifice is edged with a seat for receiving the rim of each of said blanks, each blank being provided with a neck that, in the blowing position, emerges from said orifice while its body is engaged in said molding cavity, wherein said mold is arranged according to claim 1.

* * * * *